Figure 1:
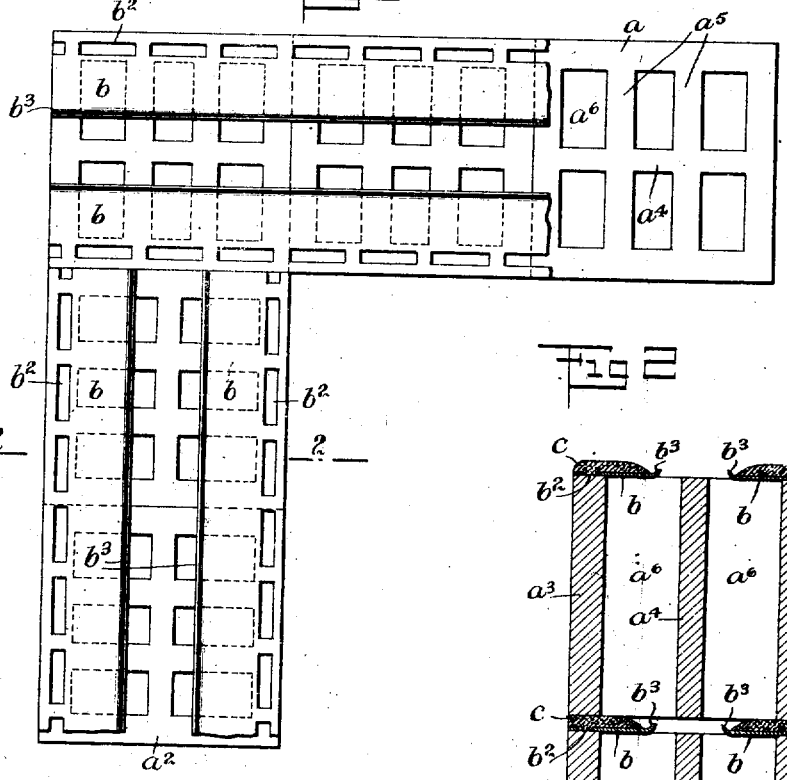

H. H. SMITH.

BINDER FOR HOLLOW TILE BUILDING BLOCKS.

APPLICATION FILED APR. 3, 1915.

Reissued Sept. 14, 1915.

13,980.

Witness
C. J. Hachenberg

Inventor
Herbert H. Smith
By his Attorney
R. Cunliffe

UNITED STATES PATENT OFFICE.

HERBERT H. SMITH, OF BAY SHORE, NEW YORK.

BINDER FOR HOLLOW TILE BUILDING-BLOCKS.

13,980. Specification of Reissued Letters Patent. Reissued Sept. 14, 1915.

Original No. 1,113,585, dated October 13, 1914, Serial No. 783,093. Application for reissue filed April 3, 1915. Serial No. 19,055.

*To all whom it may concern:*

Be it known that I, HERBERT H. SMITH, a citizen of the United States, and residing at Bay Shore, in the county of Suffolk and State of New York, have invented certain new and useful Improvements in Binders for Hollow Tile Building-Blocks, of which the following is a specification, such as will enable those skilled in the art to which it appertains to make and use the same.

The object of this invention is to provide a binder for what are known as hollow tile building blocks used in the construction of the walls of buildings of various kinds or classes, and a further object of the invention is to provide a device of the class specified which will operate to save both labor and mortar. It is a well known fact that a very large per cent. of the mortar employed in building walls of hollow tile blocks is lost by falling down into and through the holes in the blocks, and in order to prevent this it is customary for masons or operators to hold one hand so as to prevent the mortar from falling down into and through said holes, while applying the mortar with a trowel held in the other hand; and the chief object of my invention is to provide a binder for use in the construction of walls composed of blocks of the class specified, which will operate to prevent both of the foregoing difficulties.

The invention is fully disclosed in the following specification of which the accompanying drawing forms a part, in which the separate parts of my improvement are designated by suitable reference characters in each of the views, and in which:—

Figure 2:
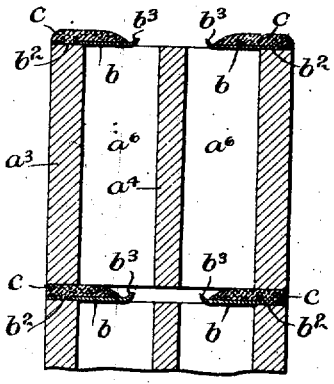
Figure 3:
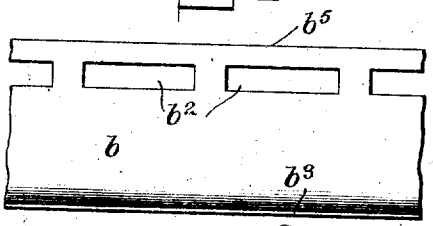
Figure 4:
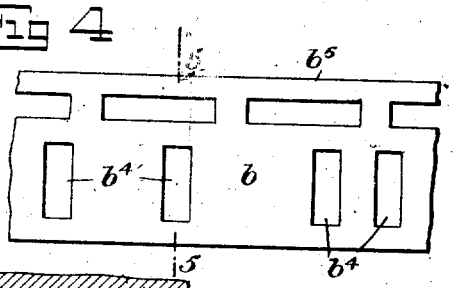
Figure 5:
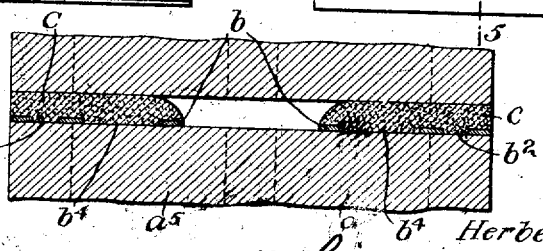

Figure 1 is a plan view of the corner portion of a wall of a building in the process of construction and showing a method of using my improved binder. Fig. 2 is a cross section on the line 2—2 of Fig. 1. Fig. 3 is a plan view showing a part of a binder detached. Fig. 4 is a view similar to Fig. 3 but showing a modified form of binder. Fig. 5 is a transverse section on the line 5—5 of Fig. 4, and showing a method of using the binder shown in said figure.

In Fig. 1 of the accompanying drawing, I have shown the corner portion of the wall of a building composed of hollow tile building blocks, said wall being in the process of construction and consisting of two parts $a$ and $a^2$ at right angles to each other, and the parts $a$ and $a^2$ of the wall are composed of building tiles or blocks $a^3$ having partitions $a^4$ and $a^5$ which cross each other at right angles to form holes $a^6$ which pass vertically through said tiles or blocks. In the practice of my invention, I provide a binder $b$ composed of thin sheet metal and provided adjacent one edge, in the construction shown in Fig. 3, with longitudinally extending slots or openings $b^2$. In practice, these binders may be of any desired length and are placed on each layer of the blocks or tiles with the edge $b^3$ thereof flush with the inner and outer faces of the wall, or if preferred, slightly inwardly of said faces, and the mortar $c$ is placed on said binders and the wall is built up in the usual manner by placing a layer of tiles or blocks on the mortar $c$ placed on the binders $b$. In building walls of this class, it is customary to place the mortar only on the outer side or face walls of the building tiles or blocks, and in this operation a large part of the mortar falls down through, or passes down through the holes $a^6$, formed by the partitions $a^4$ and $a^5$, and the only way this can be prevented is to hold one hand inwardly of the inner or outer faces of said walls to catch the mortar which would otherwise fall down through the holes $a^6$, while said mortar is being applied by a trowel held in the other hand. With my improvement, however, the mortar $c$ is spread on the binders $b$, as shown in Figs. 1 and 2, and said binders are also wide enough to prevent the mortar from falling down through the holes $a^6$, and to assist in this operation, the inner edges of the binders are preferably curved upwardly, as shown at $b^3$, but this curve of the inner edges of the binders is not absolutely necessary and said binders may, if desired, be made as shown in Figs. 4 and 5. The bent up inner edges, however, serve to retain the moisture in the mortar and are desirable for this reason also. They extend upwardly only a slight distance—less than a thickness of the mortar layer—so that they do not interfere with the laying of the tiles.

In the use of my improvement, as hereinbefore described, the mortar passes through the slots or openings $b^2$ and rests in contact with and on the side, or inner and outer surfaces of the tiles or blocks, as shown in Fig. 2, and the successive layers or tiles or blocks are bound together by the mortar in the same manner as though the binders $b$ were not employed.

In Figs. 4 and 5, I have shown a modification in which, in addition to dispensing with the raised inner edges of the binders I provide the body portions of said binders with transverse slots or openings $b^4$, and in practice the binders are so formed and so placed that the transverse slots or openings $b^4$ will register with the transverse partitions $a^5$ in the building tiles or blocks, and with this form of construction the mortar when placed on the binders will come in contact with both the transverse partition walls $a^5$ of the tile or blocks, as shown in Fig. 5, and with the opposite side or inner and outer walls thereof, as is also shown in said figure.

My improvement may be employed in connection with hollow building tiles or blocks, of any dimensions and of any number of partitions and of any shape or form, either square, oblong, or of other shape, and the binders, while preferably made of thin sheet metal may be made of fibrous or other material if desired.

Having fully described my invention, what I claim as new and desire to secure by Letters Patent is:

1. A binder for use in the construction of walls of hollow building tiles or blocks, consisting of a thin strip or strips of sheet material of less transverse width than said walls, and provided adjacent one side edge with slots or openings extending longitudinally thereof and adapted to register with a side wall of said tiles or blocks, the other side edge of said strip or strips being bent upwardly.

2. A binder for use in the construction of walls of hollow building tiles or blocks, consisting of a thin strip or strips of sheet material of less transverse width than said walls, and provided adjacent one side edge with slots or openings extending longitudinally thereof and adapted to register with a side wall of said tiles or blocks, the other side edge of said strip or strips being bent upwardly, and the body portion of said strip or strips being also provided at predetermined intervals with slots or openings extending transversely of the strip.

3. A binder for the hollow building blocks or tiles of a wall structure comprising a relatively continuous strip of sheet material extending across the open ends of a plurality of the blocks whereby to bind a plurality of the blocks together and of less transverse width than the blocks to avoid blocking the air passages through the blocks, said strip having slots in the edge portion thereof registering with the side walls of the blocks and having the inner edge portion thereof bordering the openings in the blocks solid to hold the mortar.

HERBERT H. SMITH.

Witnesses:

HENDERSON F. HILL,
R. C. MITCHELL.